United States Patent [19]

Dukess

[11] 4,327,552

[45] May 4, 1982

[54] SOLAR HEAT APPARATUS

[76] Inventor: Joseph Dukess, 931 Greacen Point Rd., Mamaroneck, N.Y. 10543

[21] Appl. No.: 60,720

[22] Filed: Jul. 26, 1979

Related U.S. Application Data

[63] Continuation-in-part of Ser. No. 794,448, May 6, 1977, Pat. No. 4,166,769.

[51] Int. Cl.³ ............................................. F03G 7/02
[52] U.S. Cl. .................................. 60/641.7; 60/527; 126/440; 203/DIG. 1; 203/DIG. 20
[58] Field of Search ............... 126/440, 438, 424, 451, 126/443, 437; 60/641, 527, 641.7; 203/DIG. 1, 10, 11, DIG. 20, DIG. 16; 202/234, 268

[56] References Cited

U.S. PATENT DOCUMENTS

| | | | |
|---|---|---|---|
| 1,753,227 | 4/1930 | Wheeler et al. | 126/437 |
| 1,888,620 | 11/1932 | Clark | 126/437 |
| 1,989,999 | 2/1935 | Niederle | 126/43 |
| 3,117,414 | 1/1964 | Daniels et al. | 60/526 |
| 3,125,091 | 3/1964 | Sleeper | 126/440 |
| 3,203,167 | 8/1965 | Green | 126/438 |
| 3,359,183 | 12/1967 | Kenk | 202/234 |
| 3,984,985 | 10/1976 | Lapeyre | 60/641 |
| 3,989,032 | 11/1976 | Harrison | 126/437 |
| 3,998,056 | 12/1976 | Clark | 60/641 |
| 4,006,594 | 2/1977 | Horton | 60/641 |
| 4,075,063 | 2/1978 | Tsay et al. | 202/234 |
| 4,094,146 | 6/1978 | Schweitzer | 60/641 |
| 4,185,615 | 1/1980 | Bottum | 126/424 |
| 4,204,914 | 5/1980 | Diggs | 202/234 |

Primary Examiner—Wilbur L. Bascomb, Jr.
Attorney, Agent, or Firm—Alan H. Levine

[57] ABSTRACT

A solar energy device comprising a body having a plurality of spaced focusing lenses to concentrate direct and reflected rays from the sun. A heat receiving member is inside of the body. One of the body and the member is expansible and contractible so that there is a relative movement between the surface of member and the focal points of the lenses, the member surface thereby being alternately in and out of coincidence with the lens focal points. The member is supported within the body and fed fluid to be heated. The heated fluid is then removed from the member. The heat receiving member or body that is expansible and contractible may be used as a prime mover.

6 Claims, 5 Drawing Figures

SOLAR HEAT APPARATUS

This application is a continuation-in-part of copending application Ser. No. 794,448, filed May 6, 1977, now U.S. Pat. No. 4,166,769.

The present invention relates to a solar energy device, and more particularly to an apparatus for collecting the radiant energy of the sun through direct and reflected rays therefrom.

In the past various arrangements of lenses have been used to concentrate the rays of the sun for the purpose of extracting solar energy.

In U.S. Pat. No. 3,934,573 there is disclosed the use of a spherical system for directing the sun's rays through lenses onto a boiler. However, the heat from such rigidly mounted lenses focused on a rigid boiler requires the use of expensive materials for use in the boiler and eliminates the possibility of using low cost materials in the production of solar energy. No means are provided for moving the boiler skin slightly out of focus upon an increase in temperature above a predetermined level.

The expansion of fluids through application of solar radiation is old in the art as shown in U.S. Pat. No. 3,436,908 but such patent does not conceive of an expansible and contractible member for heating fluids. Likewise, U.S. Pat. No. 3,908,631 which is directed to apparatus for converting solar radiation to thermal energy by heating a gaseous stream of air does not utilize an expansible and contractible member for minimizing cost and production difficulties of the solar energy apparatus.

It is the object of this invention to provide a low cost solar energy device capable of being manufactured out of inexpensive materials, which can be used for individual installations in homes, factories, and offices to provide heat and energy, yet which may be made of materials of lower melting temperatures thereby facilitating manufacturing processes.

The concept of the invention is to provide a solar energy device in the form of a body having a plurality of spaced focusing lenses thereon for concentrating direct and reflected rays of the sun. A member is disposed in the body and contains a black heat absorbent core. Either the body or the member is expansible and contractible so as to direct the lenses into focus on the surface of the member until a predetermined temperature is reached whereby the member will expand so its surface is out of the focal point to lessen concentrated heat thereon. Thereafter contraction will return the focal point to the surface of the member and heating continues at the optimum rate. The member is suspended on the feed conduit and discharge conduit for delivering fluid to be heated and for receiving heated fluid. The solar energy device is made of easily worked materials including plastics and metals and is adapted for home use for heating, power, and desalinization.

The alternating expansion and contraction of the member or body can be harnessed to perform useful work.

Figure 1:
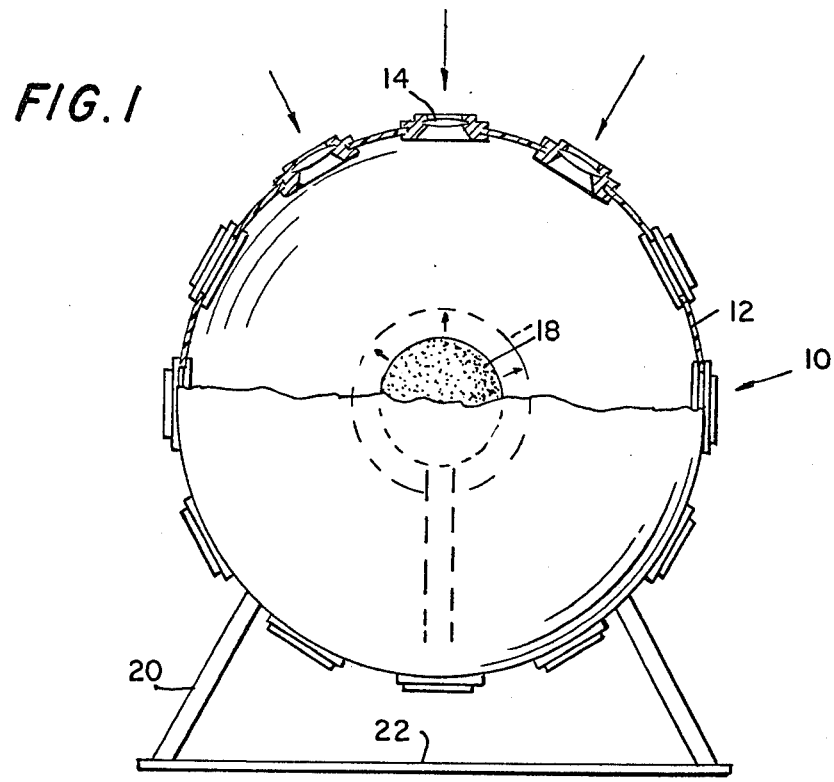
FIG. 1 is a schematic view of one embodiment of the invention employing a rigid outer body and a flexible inner member.
Figure 3:
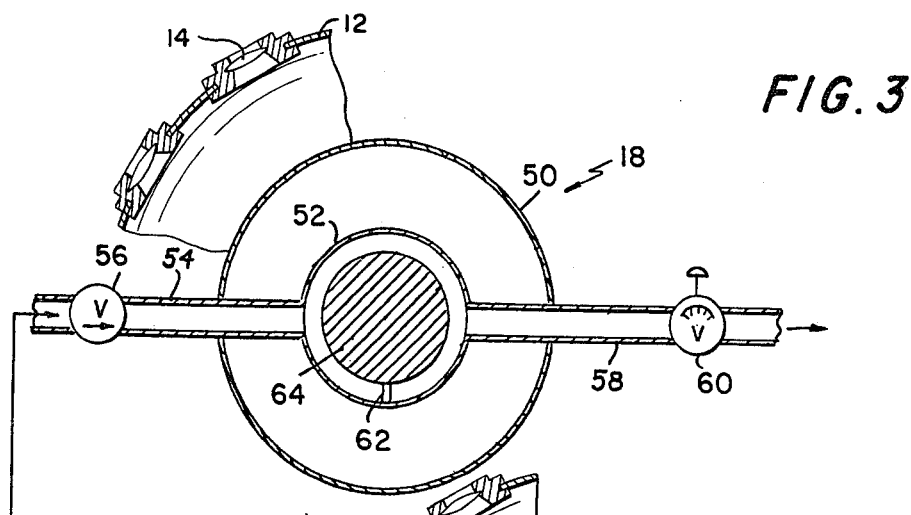
FIG. 3 is a sectional schematic view illustrating in greater detail the flexible inner member, a fragment of the outer body also being shown.
Figure 4:
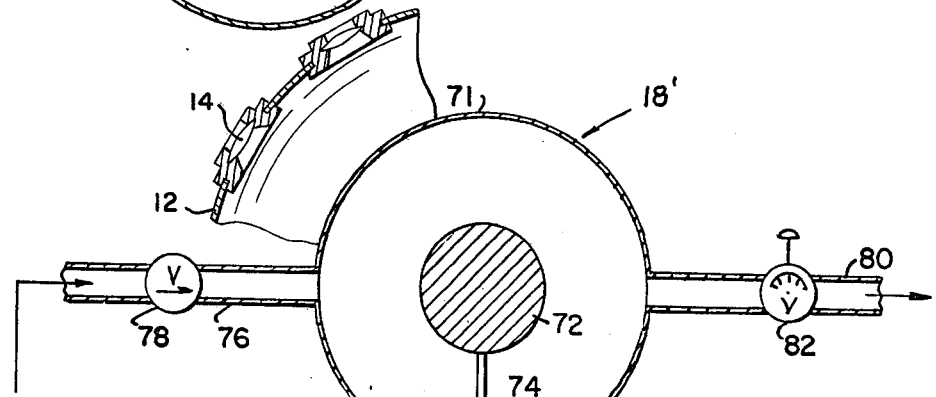
FIG. 4 is a sectional schematic view showing a modified form of the heating member, a fragment of the outer body also being shown.
Figure 5:
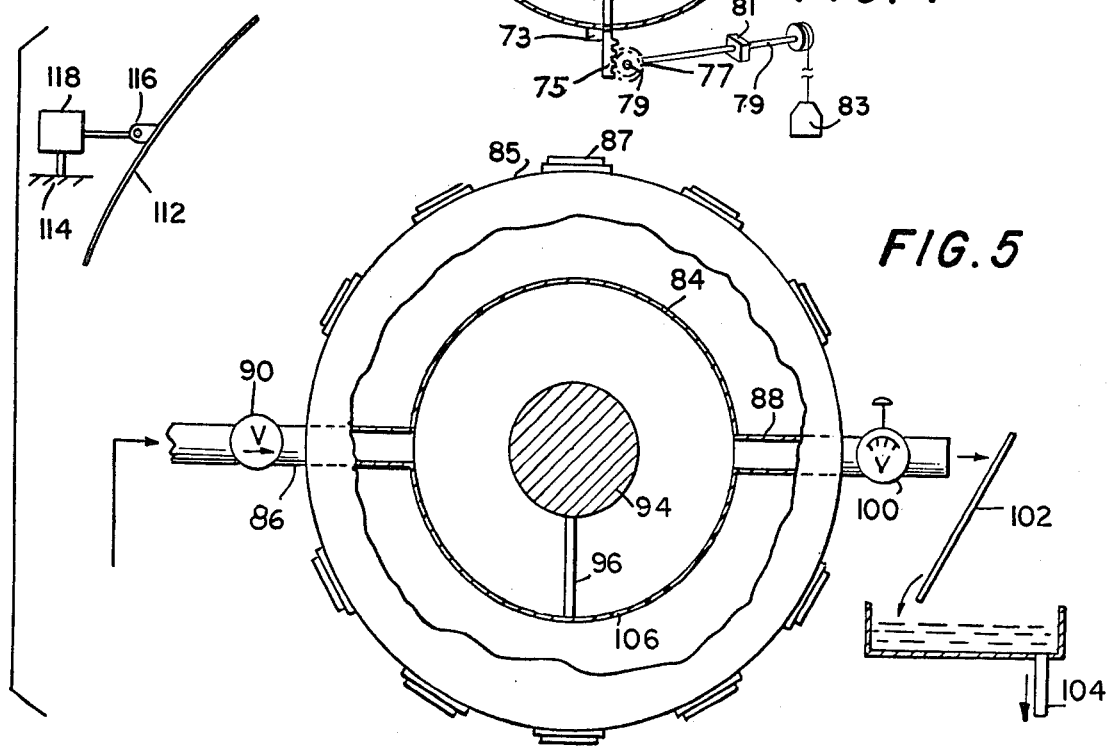
FIG. 5 is a schematic illustration of a desalinization plant in accordance with the concepts of the invention.

With reference to the accompanying drawings, wherein like reference numerals designate similar parts throughout the various views, FIG. 1 shows an embodiment of a solar heating device 10 according to the present invention. In this embodiment, a rigid spherical body 12 of plastic or metal is provided with a plurality of lenses 14 for focusing both direct and reflected rays from the sun. The body 12 may be transparent. The lenses 14 are disposed about the entire surface of body 12. The lenses and/or the entire inner surface of body 12 may be coated with a reflecting film. Within the spherical body 12 is an expansible and contractible member 18, the details of the construction of which are shown in FIGS. 3 through 5. The spherical body 12 is supported by stanchions or suitable supports 20 above a mirror or other reflecting surface 22.

The heating member 18 may be in the form shown in FIG. 3. Herein the member 18 includes an expansible and contractible sphere 50 having therein a rigid boiler 52 connected to intake conduit 54 provided with a one way valve 56 and a discharge conduit 58 provided with a pressure gage 60. The space between the member sphere 50 and the boiler 52 is filled with a fluid, preferably a gas. Inside the boiler 52 there is supported at 62 a black heat absorbing body 64.

In operation, the rays of the sun are directed through lenses 14 onto the surface of the sphere 50, which coincides with the focal points of lenses 14 or expands upon heating to so coincide. As the sphere 50 continues to be heated it will expand beyond the lens focal points until additional cold fluid is introduced into the boiler 52 or some fluid is allowed to escape, at which point sphere 50 contracts. This allows for expansion and contraction of the surface of sphere 50 out of the focal point of the lenses to prevent spot burnout of the boiler and permit cheaper materials to be used while making use of the most available heat.

Figure 2:
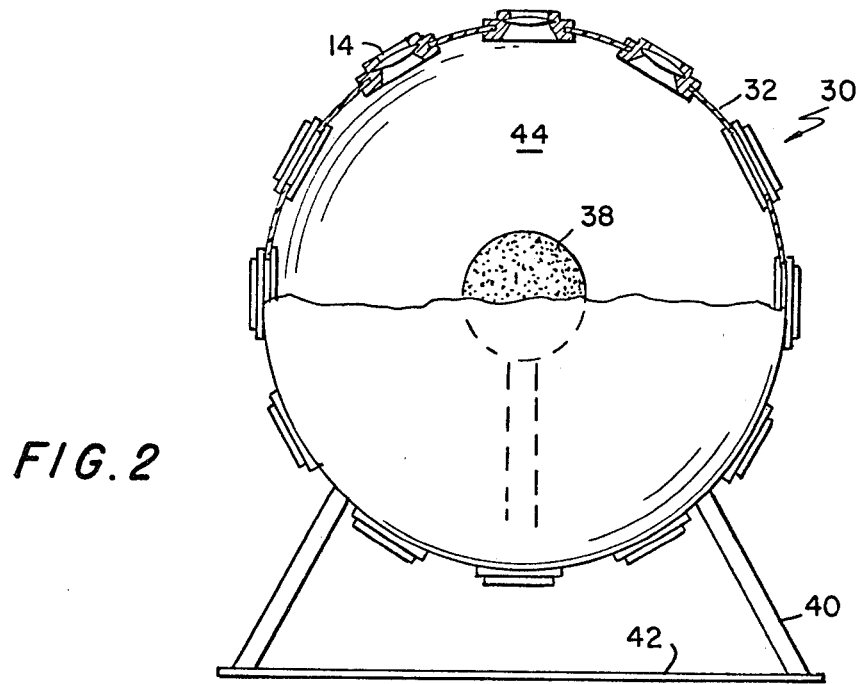
FIG. 2 is a view similar to FIG. 1, illustrating another embodiment of the invention wherein the outer body is flexible and the inner member is rigid.

In FIG. 2 there is shown a form 30 of the invention wherein the spherical body 32 is made of a flexible, clear, resilient material having lenses 14 mounted all about its surface and having a fluid heating member 38 therein which may be rigid or similar to the member 18. The sphere is mounted on standards 40 above a reflecting surface 42. The spherical body may be filled with a fluid, such as a suitable liquid or an inert gas 44.

As the interior of body 32 becomes heated, the focal points of lenses 14 move into coincidence with the surface of heating member 18. Further heating causes the focal points to move radially outwardly beyond the member 18. As heated water is extracted from member 18 and cold water introduced into it, the interior of body 32 cools bringing the lens focal points again into coincidence with the surface of heating member 18.

In FIG. 4 there is shown a modified form of the heating member, identified by the reference numeral 18', which may be used within body 12 or separately. The heating member 18' includes an expansible spherical shell 71 having an inlet conduit 76 connected thereto which is provided with a one way inlet valve 78. Discharge conduit 80, provided with a valved pressure gage 82 to serve as a pressure regulator, is connected to the shell 71. A black body 72 supported at 74 is provided within the shell 71 to absorb heat and distribute heat to incoming fluid. Fixed to the expansible shell 71 is a mounting plate 73 carrying a toothed rack 75 which engages a gear 77 for driving a shaft 79. Although rack 75, and hence gear 77, move in two directions as shell 71 expands and contracts, a one-way clutch 81 between gear 77 and shaft 79 can be used to drive the shaft in one direction for performing useful work. In this form of the invention the member 18' can be placed in body 12 or may derive its heat from a mirror, parabolic reflector, or receiver, or the like and may be used to transport, for example, a parabolic mirror. The shaft 79 when rotated can carry the reflector along a solar track. As a cloud cover develops when the shell 71 is contracting a ratchet arrangement could disengage the movement of the reflector. As solar heat redevelops the drive of the shaft 79 would keep the reflector moving. Thus the arrangement could track mirrors and other heat seeking devices. After a predetermined length of time the various devices could be sent back, by spring device or the like, for the start of another solar day.

The periodic movement of shaft 79 could be used to lift a weight 83 which thereafter can be allowed to fall to perform some desired function. Alternatively, shell 71 may be connected to a plunger within a fluid-filled chamber. Upon each expansion of shell 71, the plunger pressurizes the chamber and pushes fluid out of the chamber through a oneway valve. Upon each contraction of shell 71, the plunger moves in the opposite direction and draws additional fluid, from a reservoir, into the chamber through a second oneway valve. The periodic pulses of fluid leaving the chamber can be used to perform some desired work. The work-performing mechanism 73, 75, 79, 81, 83 may be associated with sphere 50 of the embodiment of FIG. 3 as well as with shell 71 of the FIG. 4 embodiment.

As shown in FIG. 5, this solar energy device may be employed for desalinization of water. In this embodiment, the outer body 85 is provided with lenses 87. The body 85 may be transparent and the body and the lenses may be provided on their inner surfaces with a "one way" coating. The resilient heating member 84 is mounted within the body 85 by inlet conduit 86 connected to a source of saline water and by discharge conduit 88. Saline water entering through one way valve 90 will pass into the heating member 84 where the saline water will be in contact with black body 94 supported at 96 within the heating member 84. Heat from the focused sun's rays on the member 84 will turn the saline water to steam and salt. The steam will be at a pressure regulated by pressure gage and valve 100 and will flow into a condenser, shown schematically by condenser plate 102 and thence at 104 to a reservoir for further consumption. The salt can be removed by flushing with fresh water periodically or through use of an access port 106.

In order to enhance heating capabilities a reflector, such as a parabolic reflector 112, may be employed and mounted, for more than one degree of movement about a track 114, on a universal joint 116 controllable by a direct mechanical linkage as heretofore described with reference to FIG. 4, or by a sun following photoelectric device 118. Thus the reflector can move to assume an optimum position by following the sun.

While the solar energy device has been described in several embodiments herein, it is recognized that variations and changes may be made within the scope of the appended claims. For example, although body 12 and member 18 have been shown in spherical form, other shapes can be used. The body and member could have relatively flat rectangular shapes, similar to that of a conventional solar water heater used on the roof of a house, the lenses being arranged in a plane parallel to the flat surface of the heating member.

I claim:
1. A solar energy device comprising:
   a fluid heater including an expansible and contractible member adapted to be exposed to the sun,
   means connectable to a source of fluid outside the device for introducing relatively cold fluid to be heated into the member wherein the fluid is heated by solar energy,
   means for withdrawing heated fluid from the member and allowing it to escape therefrom,
   the member expanding in response to the heating of fluid within it and contracting in response to the introduction of relatively cold fluid into it, and
   means for transmitting the expansions and contractions of the member to a work-performing mechanism.
2. A solar energy device as defined in claim 1 including a body within which said member is located, said body carrying a plurality of laterally spaced apart lenses for concentrating rays from the sun on said member.
3. A solar energy device as defined in claim 1 wherein said expansible and contractible member carries a plurality of laterally spaced apart lenses, and including another member within said expansible and contractible member for receiving the cold fluid to be heated, said lenses concentrating the sun's rays on said other member.
4. A solar energy device as defined in claim 3 wherein said expansible and contractible member is filled with a fluid, other than the fluid to be heated, which aids its expansion and contraction.
5. A solar energy device as defined in claim 1 including a heat-absorbing core within said member.
6. A solar energy device as defined in claim 1 including a reflecting surface for reflecting the rays of the sun at said member.

* * * * *